United States Patent
Hasegawa et al.

(10) Patent No.: US 8,289,454 B2
(45) Date of Patent: Oct. 16, 2012

(54) SIGNAL CONVERSION DEVICE, VIDEO PROJECTION DEVICE, AND VIDEO PROJECTION SYSTEM

(75) Inventors: Hiroshi Hasegawa, Chino (JP); Toshiki Fujimori, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 811 days.

(21) Appl. No.: 12/331,926

(22) Filed: Dec. 10, 2008

(65) Prior Publication Data
US 2009/0147153 A1 Jun. 11, 2009

(30) Foreign Application Priority Data
Dec. 11, 2007 (JP) .................. 2007-319281

(51) Int. Cl.
H04N 5/57 (2006.01)
H04N 5/64 (2006.01)
H04N 9/31 (2006.01)
H04N 5/74 (2006.01)
G02F 1/00 (2006.01)
G02B 27/12 (2006.01)
G09G 5/10 (2006.01)
G03B 21/14 (2006.01)

(52) U.S. Cl. ........ 348/687; 348/744; 348/751; 359/640; 345/690; 353/69

(58) Field of Classification Search .................. None
See application file for complete search history.

(56) References Cited

U.S. PATENT DOCUMENTS

| 5,602,679 | A | * | 2/1997 | Dolgoff et al. | 359/640 |
| 5,793,446 | A | * | 8/1998 | Nose et al. | 348/751 |
| 2003/0169281 | A1 | * | 9/2003 | Nishi et al. | 345/690 |
| 2007/0115440 | A1 | * | 5/2007 | Wiklof | 353/69 |
| 2008/0024683 | A1 | * | 1/2008 | Damera-Venkata et al. | 348/744 |

FOREIGN PATENT DOCUMENTS
JP 2003-125317 4/2003
JP 2005-221562 8/2005

* cited by examiner

Primary Examiner — Jefferey Harold
Assistant Examiner — Sean Haiem
(74) Attorney, Agent, or Firm — Maschoff Gilmore & Israelsen

(57) ABSTRACT

A signal conversion device supplies a video signal to each video projection device of plural video projection devices that display a video image by superimposing the projection image. The device includes a characteristic information transmitting unit that transmits, to at least one video projection device of the plural video projection devices, characteristic information representing a light modulation characteristic of a light modulation element provided in the at least one video projection device, and a signal conversion processing unit that performs signal conversion processing corresponding to each of the video projection devices to an input video signal in accordance with the characteristic information transmitted from the characteristic information transmitting unit, and supplies the video signal after the signal conversion processing to each of the video projection devices.

9 Claims, 16 Drawing Sheets

| INPUT SIGNAL VALUE (0x000-0xfff) | OUTPUT SIGNAL VALUE TO PJ1 (0x00-0xff) | OUTPUT SIGNAL VALUE TO PJ2 (0x00-0xff) |
|---|---|---|
| 0x000 | 0x00 | 0x00 |
| ⋮ | ⋮ | ⋮ |
| 0x010 | 0x01 | 0x00 |
| ⋮ | ⋮ | ⋮ |
| 0x018 | 0x00 | 0x01 |
| 0x019 | 0x01 | 0x01 |
| 0x020 | 0x02 | 0x00 |
| ⋮ | ⋮ | ⋮ |
| 0x028 | 0x01 | 0x01 |
| ⋮ | ⋮ | ⋮ |
| 0x800 | 0x80 | 0x00 |
| ⋮ | ⋮ | ⋮ |
| 0x808 | 0x7f | 0x00 |
| 0x809 | 0x7f | 0x01 |
| 0x810 | 0x81 | 0x00 |
| ⋮ | ⋮ | ⋮ |
| 0x818 | 0x80 | 0x01 |
| ⋮ | ⋮ | ⋮ |
| 0xfff | 0xff | 0x00 |

FIG. 6

| INPUT SIGNAL VALUE (0x000-0xfff) | OUTPUT SIGNAL VALUE TO PJ1 (0x00-0xff) | OUTPUT SIGNAL VALUE TO PJ2 (0x00-0xff) | FLAG |
|---|---|---|---|
| 0x000 | 0x00 | 0x00 | 1 |
| 0x008 | 0x00 | 0x04 | 0 |
| 0x010 | 0x01 | 0x00 | 0 |
| 0x018 | 0x03 | 0x01 | 0 |
| 0x020 | 0x04 | 0x01 | 1 |
| 0x028 | 0x02 | 0x05 | 1 |
| ⋮ | ⋮ | ⋮ | ⋮ | though it is theoretically possible to realize unlimited gradation levels, practically, it is difficult to accurately reproduce multiple gradation levels. Meanwhile, in the case of expressing gradation by PWM control, the moving speed of a physical movable mechanism such as a mirror reaches its limit, making it difficult to acquire high resolution. It is also difficult to increase the pixel density to perform on-off control of pixels at a high speed.

On the other hand, unlike a direct-view display, a projector as a video projection device can easily superimpose plural projection videos on the screen. Thus, using this characteristic, the same video is superimposed and displayed on the screen from plural projectors, thereby improving luminance. For example, JP-A-2003-125317 discloses a technique of superimposing projection videos from two projectors and thereby increasing the number of gradation levels.

However, in the technique disclosed in JP-A-2003-125317, videos are projected in such a manner that the two projectors project substantially the same quantity of light for each gradation level or in such a manner that the quantity of light projected by one projector for each gradation level is substantially an integral multiple of the quantity of light projected by the other projector for each gradation level. Therefore, in consideration of non-linearity of light modulation elements of the projectors and non-linearity of the characteristics of the eyes of a person viewing the video, the multi-gradation effect may be low even when the video is projected as disclosed in JP-A-2003-125317.

SUMMARY

An advantage of some aspects of the invention is that a signal conversion device, a video projection device and a video projection system are provided which realize multiple gradation levels in accordance with the characteristics of plural video projection devices.

According to an aspect of the invention, there is provided a signal conversion device which supplies a video signal to each video projection device of plural video projection devices that display a projection image by superimposing the projection image. The signal conversion device includes a characteristic information transmitting unit that transmits, to at least one video projection device of the plural video projection devices, characteristic information representing a light modulation characteristic of a light modulation element provided in the at least one video projection device, and a signal conversion processing unit that performs signal conversion processing corresponding to each of the video projection devices to an input video signal in accordance with the characteristic information transmitted from the characteristic information transmitting unit, and that supplies the video signal after the signal conversion processing to each of the video projection devices.

According to this aspect of the invention, in the case of superimposing and displaying projection images of plural video projection devices, characteristic information of the light modulation element provided in the video projection devices is transmitted and the light modulation characteristic of the light modulation element is controlled. In accordance with this characteristic information, signal conversion processing corresponding to each video projection device is performed to an input video signal. The video signal after the signal conversion processing is supplied to each video projection device. Therefore, multiple gradation levels can be realized.

It is also preferable that the characteristic information transmitting unit can transmit different characteristic information to first and second video projection devices of the plural video projection devices.

According to this aspect of the invention, in the case of superimposing and displaying projection images of plural video projection devices, the number of gradation levels can be securely increased over an entire range, irrespective of whether it is on the high-luminance side or low-luminance side. The gradation expression can be controlled more finely.

It is also preferable that characteristic information representing a light modulation characteristic of a light modulation element provided in the first video projection device is obtained from an inverse function of a function calculated from characteristic information representing a light modulation characteristic of a light modulation element provided in the second video projection device.

According to this aspect of the invention, gradation can be securely and finely controlled over an entire range including a high-luminance range to a low-luminance range.

It is also preferable that the number of gradation levels that can be expressed by the input video signal is greater than the number of gradation levels that can be expressed by a video signal supplied to each of the video projection devices.

According to this aspect of the invention, in addition to the above advantages, an inexpensive projector with a small number of gradation levels can be used even in the case of handling an input video signal with a large number of gradation levels, and a multi-gradation video can be accurately controlled with a low cost.

According to another aspect of the invention, a video projection device is provided which includes the above signal conversion device and a projection unit that projects a video in accordance with a video signal from the signal conversion device.

According to this aspect of the invention, in the case of superimposing and displaying projection images from plural video projection devices, multiple gradation levels can be realized in accordance with the characteristics of these video projection devices.

It is also preferable that the video projection device includes a luminance detecting unit that detects luminance of a projection image from another video projection device projected on a screen, and that the input video signal is supplied to the video projection device and a video signal converted from the input video signal in accordance with the luminance detected by the luminance detecting unit can be used to project a video.

According to this aspect of the invention, even if another video projection device does not have a function of receiving its characteristic information and displaying a video based on the received characteristic information, multiple gradation levels can be realized in accordance with the characteristics of plural video projection devices.

According to still another aspect of the invention, a video projection system includes the above signal conversion device and plural video projection devices that project an image in accordance with a video signal from the signal conversion device. In the video projection system, a projection image from each video projection device of the plural video projection devices is superimposed and displayed.

According to this aspect of the invention, a video projection system can be provided which realizes multiple gradation levels in accordance with the characteristics of plural video projection devices.

It is also preferable that a first video projection device of the plural video projection devices transmits characteristic information representing a light modulation characteristic of a light modulation element of the first video projection device to the signal conversion device, and that the signal conversion device transmits characteristic information corresponding to the characteristic information of the light modulation element of the first video projection device to a second video projection device of the plural video projection devices.

According to this aspect of the invention, even if the video projection system includes a video projection device that does not have a function of receiving characteristic information and displaying a video based on the received characteristic information, multiple gradation levels can be realized in accordance with the characteristics of plural video projection devices.

BRIEF DESCRIPTION OF THE DRAWINGS

The invention will be described with reference to the accompanying drawings, wherein like numbers reference like elements.

FIG. 6 is an explanatory view showing a conversion table stored in a conversion table storage unit shown in FIG. 4.

DESCRIPTION OF EXEMPLARY EMBODIMENTS

Hereinafter, embodiments of the invention will be described in detail with reference to the drawings. The following embodiments are not used to duly limit the scope of the invention set forth in claims. Moreover, all the elements of the configuration described hereinafter are not necessarily essential elements of the invention.

In the following description, a video projection system according to an embodiment of the invention includes two video projection devices in order to simplify the explanation. However, the invention is not limited to this and the video projection system according to the invention may include three video projection devices.

First Embodiment

Figure 1:
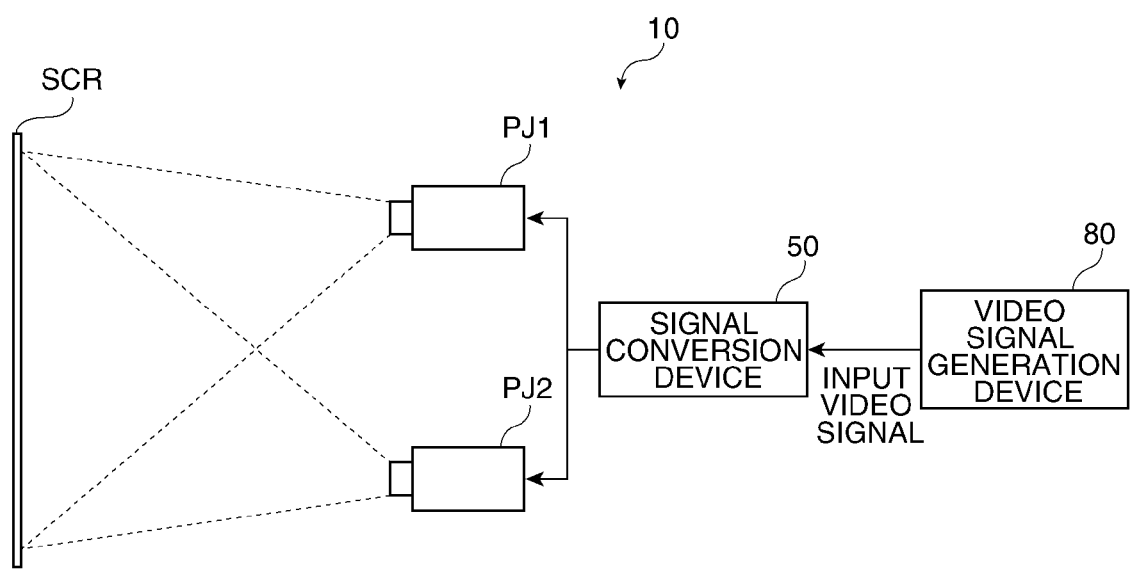
FIG. 1 is a block diagram showing an exemplary configuration of a video projection system according to a first embodiment of the invention.

FIG. 1 is a block diagram showing an exemplary configuration of a video projection system according to a first embodiment of the invention.

A video projection system 10 according to the first embodiment includes first and second projectors PJ1 and PJ2, and a signal conversion device 50. The video projection system 10 may further include at least one screen SCR or video signal generation device 80. The first and second projectors PJ1 and PJ2 project by superimposing an image corresponding to a video signal from the signal conversion device 50 onto the screen SCR. More specifically, each of the first and second projectors PJ1 and PJ2 includes a light modulation element and a projection unit. The light modulation element modulates light from a light source in accordance with a video signal. The projection unit projects the modulated light onto the screen SCR.

Each of the first and second projectors PJ1 and PJ2 according to the first embodiment stores characteristic information that prescribes the gradation characteristic (light modulation characteristic) of the light modulation element. When a video signal is inputted to each projector, the light modulation element is driven with a transmittance (modulation rate) corresponding to the video signal in accordance with the characteristic information. In FIG. 1, the characteristic information that prescribes the gradation characteristic of each projector is configured to be rewritable. When the characteristic information is rewritten, the transmittance of the light modulation element is changed in accordance with the rewritten characteristic information.

The video signal generation device 80 generates a content image to be projected onto the screen SCR and generates a video signal corresponding to the content image. The video signal generated by the video signal generation device 80 is inputted to the signal conversion device 50 as an input video signal.

The signal conversion device 50 transmits characteristic information to each of the first and second projectors PJ1 and PJ2 in order to display pixels having luminance that is acquired in accordance with the gradation characteristic (light modulation characteristic) as the video projection system 10. In addition, the signal conversion device 50 converts the input video signal from the video signal generation device 80 in accordance with the characteristic information transmitted to each projector and in accordance with each projector, and outputs the converted video signal to each projector. That is, in FIG. 1, the signal conversion device 50 transmits characteristic information to the first and second projectors PJ1 and PJ2. The signal conversion device 50 also outputs to the first projector PJ1 a video signal converted for the first projector PJ1 from the input video signal from the video signal generation device 80, and outputs to the second projector PJ2 a video signal converted for the second projector PJ2 from the input video signal.

The first and second projectors PJ1 and PJ2 project their respective projection images onto the screen SCR so that the positions of the pixels within their projection images coincide with each other. Thus, in the video projection system 10, an image having output target luminance corresponding to the input video signal is displayed by the first and second projectors PJ1 and PJ2. As described above, in the first embodiment, the light modulation characteristic of each projector is designated and the video signal conforming to the designated light modulation characteristic of each projector is input.

Figure 2:
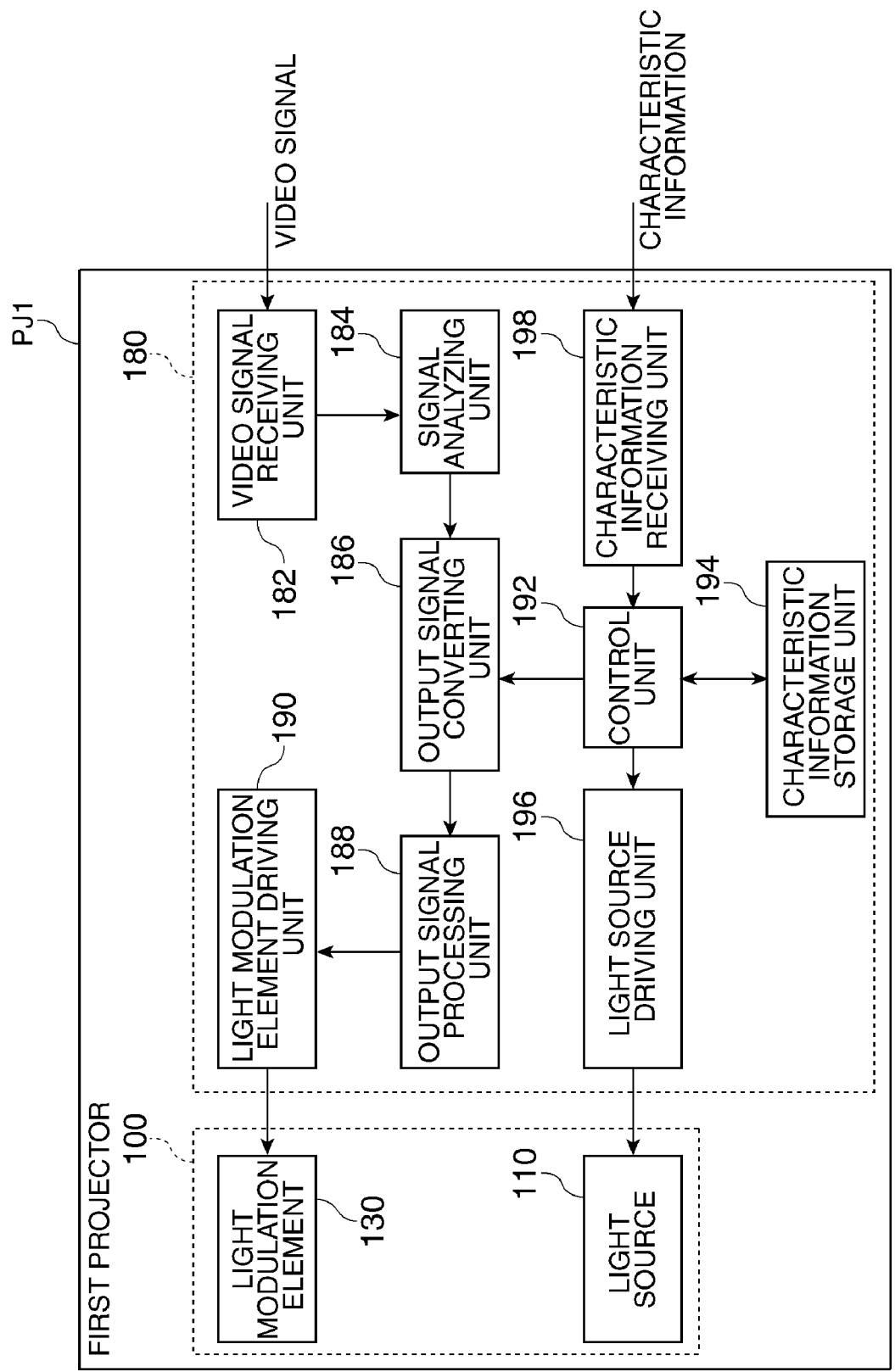
FIG. 2 is a block diagram showing an exemplary configuration of a first projector shown in FIG. 1.

FIG. 2 is a block diagram showing an exemplary configuration of the first projector PJ1 shown in FIG. 1. The first projector PJ1 need not necessarily include the entire configuration shown in FIG. 2. While FIG. 2 shows an exemplary configuration of the first projector PJ1, the second projector PJ2 may also have a configuration similar to the first projector PJ1.

The first projector PJ1 includes an optical system block 100 that realizes the functions of a light modulation unit and a projection unit, and a control block 180 to control the optical system block 100.

The optical system block 100 includes a light source 110 and a light modulation element 130 (light modulation unit). Light generated by the light source 110 is cast onto the light modulation element 130. The light modulation element 130 changes its light modulation rate in accordance with a control signal from the control block 180. Thereby, a projection image can be generated.

The control block 180 includes a video signal receiving unit 182, a signal analyzing unit 184, an output signal converting unit 186, an output signal processing unit 188, a light modulation element driving unit 190, a control unit 192, a characteristic information storage unit 194, a light source driving unit 196, and a characteristic information receiving unit 198.

The video signal receiving unit 182 performs receiving interface processing of a video signal from the signal conversion device 50. The signal analyzing unit 184 analyzes the video signal received by the video signal receiving unit 182 and performs conversion processing to convert the video signal to a signal format for processing within the first projector PJ1. The conversion processing may be, for example, processing to convert a video signal of an interlace format to a video signal of a progressive format. The characteristic information storage unit 194 stores characteristic information of light modulation characteristics (gradation characteristic and gamma characteristic) of the light modulation element 130 provided in the first projector PJ1. This characteristic information is information that prescribes the light modulation rate of the light modulation element of the first projector PJ1 with respect to a video signal inputted to the first projector PJ1. The characteristic information storage unit 194 is configured in such a manner that its stored information is rewritable to characteristic information that is transmitted from outside.

The output signal converting unit 186 performs gamma conversion of the video signal from the signal analyzing unit 184 in accordance with the characteristic information stored in the characteristic information storage unit 194, and outputs the gamma-converted video signal. Therefore, the characteristic information transmitted from outside is once stored in the characteristic information storage unit 194, and the output signal converting unit 186 can perform gamma conversion corresponding to the characteristic information stored in the characteristic information storage unit 194.

The output signal processing unit 188 performs raster conversion of the video signal after the gamma conversion performed by the output signal converting unit 186. The light modulation element driving unit 190 generates a light modulation element control signal corresponding to the video signal as a result of processing by the output signal processing unit 188 and outputs the light modulation element control signal to the light modulation element 130. The light source driving unit 196 generates a light source control signal to control the light source 110, in accordance with an instruction from the control unit 192, and outputs the light source control signal to the light source 110. Moreover, the characteristic information receiving unit 198 performs receiving interface processing of characteristic information transmitted from outside (in FIG. 1, the signal conversion device 50). The control unit 192 controls each part within the control block 180 having the above configuration.

Figure 3:
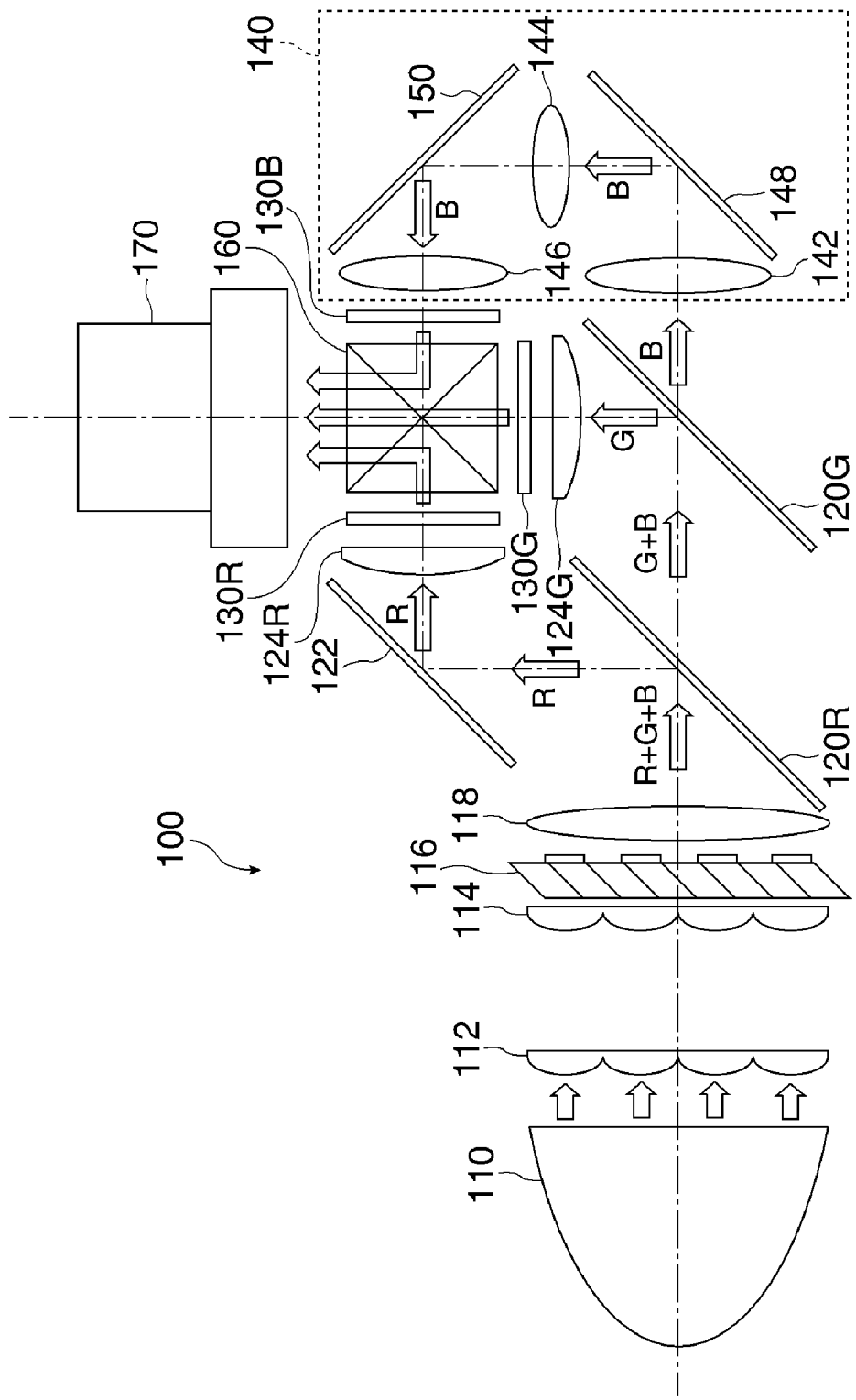
FIG. 3 is a view showing an exemplary configuration of an optical system block shown in FIG. 2.

FIG. 3 shows an exemplary configuration of the optical system block 100 shown in FIG. 2. While FIG. 3 shows an exemplary configuration employing a so-called three-plate system as the optical system block of FIG. 2, the projector as a video projection device according to the invention is not limited to the so-called three-plate system.

The optical system block 100 includes integration lenses 112 and 114, a polarization conversion element 116, a superimposing lens 118, an R dichroic mirror 120R, a G diachronic mirror 120G, a reflection mirror 122, an R field lens 124R, a G field lens 124G, a relay optical system 140, a cross dichroic prism 160, and a projection lens 170 (in a broad sense, a projection unit), in addition to the light source 110 and the light modulation element 130. In FIG. 3, since the three-plate system is adopted, an R liquid crystal panel 130R (first light modulation unit), a G liquid crystal panel 130G (second light modulation unit) and a B liquid crystal panel 130B (third light modulation unit) are employed as the light modulation element 130. The liquid crystal panels used as the R liquid crystal panel 130R, the G liquid crystal panel 130G and the B liquid crystal panel 130B are transmitting-type liquid crystal display apparatus. The relay optical system 140 includes relay lenses 142, 144 and 146, and reflection mirrors 148 and 150.

The light source 110 includes, for example, a super high pressure mercury lamp and emits light including at least R-component light, G-component light and B-component light. The light source 110 is drive-controlled by a light source control signal from the light source driving unit 196 shown in FIG. 2. The integration lens 112 has plural small lenses to split light from the light source 110 into plural partial light beams. The integration lens 114 has plural small lenses corresponding to the plural small lenses of the integration lens 112. The superimposing lens 118 superimposes the partial light beams exiting from the plural small lenses of the integration lens 112.

The polarization conversion element 116 has a polarization separation layer and a λ/2 plate. The polarization conversion element 116 transmits p-polarized light, reflects s-polarized light, and converts the p-polarized light to s-polarized light. The s-polarized light from the polarization conversion element 116 is cast onto the superimposing lens 118.

The light superimposed by the superimposing lens 118 becomes incident on the R dichroic mirror 120R. The R dichroic mirror 120R has the function of reflecting R-component light and transmitting G-component and B-component light. The light transmitted through the R dichroic mirror 120R is cast onto the G dichroic mirror 120G. The light reflected by the R dichroic mirror 120R is reflected by the reflection mirror 122 and is guided to the R field lens 124R.

The G dichroic mirror 120G has the function of reflecting G-component light and transmitting B-component light. The light transmitted through the G dichroic mirror 120G becomes incident on the relay optical system 140. The light reflected by the G dichroic mirror 120G is guided to the G field lens 124G.

The relay optical system 140 corrects the difference in optical path length by using the relay lenses 142, 144 and 146 in order to minimize the difference between the optical path length of the B-component light transmitted through the G dichroic mirror 120G and the optical path length of the other R-component and G-component light. The light transmitted through the relay lens 142 is guided to the relay lens 144 by the reflection mirror 148. The light transmitted through the relay lens 144 is guided to the relay lens 146 by the reflection mirror 150. The light transmitted through the relay lens 146 is cast onto the B liquid crystal panel 130B.

The light cast on the R field lens 124R is converted to parallel light and becomes incident on the R liquid crystal panel 130R. The R liquid crystal panel 130R functions as a light modulation element (light modulation unit) and has its transmittance (passing rate and modulation rate) changed in accordance with an R video signal. Therefore, the light (first color component light) incident on the R liquid crystal panel 130R is modulated in accordance with the R video signal and the modulated light becomes incident on the cross dichroic prism 160.

The light cast on the G field lens 124G is converted to parallel light and becomes incident on the G liquid crystal panel 130G. The G liquid crystal panel 130G functions as a light modulation element (light modulation unit) and has its transmittance (passing rate and modulation rate) changed in accordance with a G video signal. Therefore, the light (second color component light) incident on the G liquid crystal panel 130G is modulated in accordance with the G video signal and the modulated light becomes incident on the cross dichroic prism 160.

The B liquid crystal panel 130B on which light converted to parallel light by the relay lenses 142, 144 and 146 becomes incident functions as a light modulation element (light modulation unit) and has its transmittance (passing rate and modulation rate) changed in accordance with a B video signal. Therefore, the light (third color component light) incident on the B liquid crystal panel 130B is modulated in accordance with the B video signal and the modulated light becomes incident on the cross dichroic prism 160.

The R liquid crystal panel 130R, the G liquid crystal panel 130G and the B liquid crystal panel 130B have their respective modulation rates separately controlled for each color component by a light modulation element control signal from the light modulation element driving unit 190 shown in FIG. 2.

The cross dichroic prism 160 has the function of outputting, as exit light, combined light formed by combining incident light from the R liquid crystal panel 130R, the G liquid crystal panel 130G and the B liquid crystal panel 130B. The projection lens 170 is a lens that forms an image by enlarging an output image on the screen SCR.

As described above, in the optical system block 100, if the R liquid crystal panel 130R, the G liquid crystal panel 130G and the B liquid crystal panel 130B are used as first to third light modulation units, the first light modulation unit modulates the first color component light in accordance with the video signal of the first color component, the second light modulation unit modulates the second color component light in accordance with the video signal of the second color component, and the third light modulation unit modulates the third color component light in accordance with the video signal of the third color component.

The R liquid crystal panel 130R, the G liquid crystal panel 130G and the B liquid crystal panel 130B as the first to third light modulation units have their respective light modulation characteristics (gradation characteristics and gamma characteristics). The light modulation characteristics show change in transmittance (luminance, or in a broader sense, modulation rate) with respect to the input signal value specified by a video signal. In the first embodiment, in order to achieve desired output target luminance, the signal conversion device 50 designates the light modulation characteristic of each liquid crystal panel as the light modulation element of each projector, then converts an input signal to a video signal corresponding to the designated light modulation characteristic, and allocates the video signal to each projector.

Figure 4:
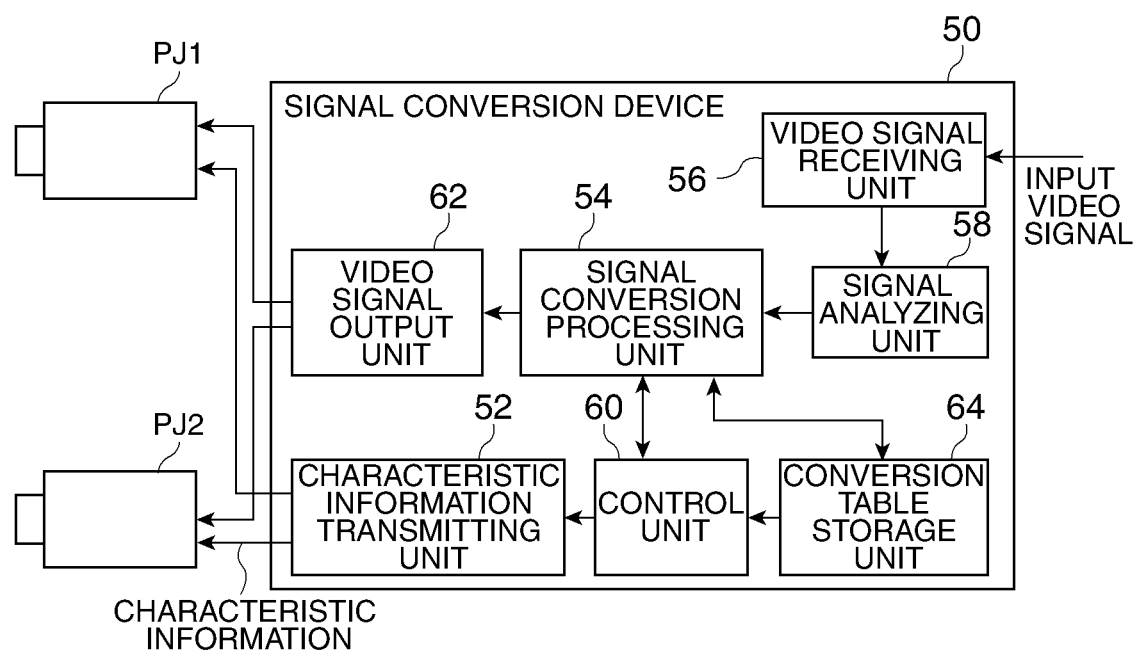
FIG. 4 is a block diagram showing an exemplary configuration of a signal conversion device according to the first embodiment.

FIG. 4 is a block diagram showing an exemplary configuration of the signal conversion device 50 according to the first embodiment. In FIG. 4, the same parts as in FIG. 1 are denoted by the same reference numerals and will not be described further in detail.

The signal conversion device 50 includes a characteristic information transmitting unit 52 and a signal conversion processing unit 54. The characteristic information transmitting unit 52 transmits, to at least one of the first and second projectors PJ1 and PJ2 forming the video projection system 10, characteristic information that prescribes the light modulation rate of the light modulation element of the projector with respect to a video signal inputted to the projector. The signal conversion processing unit 54 performs signal conversion processing corresponding to each of the first and second projectors PJ1 and PJ2 forming the video projection system 10 to an input video signal in accordance with the characteristic information transmitted from the characteristic information transmitting unit 52, and supplies the video signal after the signal conversion processing to each projector.

The characteristic information transmitting unit 52 may transmit characteristic information, for example, in a startup sequence started immediately after power of each projector is turned on, or may transmit characteristic information when approval is given from each projector after a characteristic information transmission request is sent to each projector in the startup sequence.

The signal conversion device 50 may further include a video signal receiving unit 56, a signal analyzing unit 58, a control unit 60, a video signal output unit 62, and a conversion table storage unit 64. The video signal receiving unit 56 performs receiving interface processing of an input video signal from the video signal generation device 80. The signal analyzing unit 58 analyzes the video signal received by the video signal receiving unit 56 and performs conversion processing to convert the video signal to a signal format for processing within the signal conversion device 50. Such conversion processing may be, for example, processing to convert a video signal of an interlace format to a video signal of a progressive format.

In the conversion table storage unit 64, characteristic information is stored in advance which prescribes the light modulation characteristic of each of the first and second projectors PJ1 and PJ2 forming the video projection system 10 in order to realize the gradation characteristic (light modulation characteristic) as the video projection system 10. Moreover, in the conversion table storage unit 64, a conversion table is stored which stores a video signal after converting a video signal from the signal analyzing unit 58 according to the light modulation characteristic of each projector. Therefore, the characteristic information transmitting unit 52 transmits the characteristic information stored in the conversion table storage unit 64 to each projector. Meanwhile, the signal conversion processing unit 54 converts a video signal from the signal analyzing unit 58 to a converted video signal for each projector, in accordance with the conversion table stored in the conversion table storage unit 64.

The video signal output unit 62 performs processing to convert the video signal after the signal conversion processing carried out by the signal conversion processing unit 54, to a predetermined output format. The output signal of the video signal output unit 62 is supplied to the first and second projectors PJ1 and PJ2 forming the video projection system 10. The control unit 60 controls each part of the signal conversion device 50 as described above.

Figure 5A:
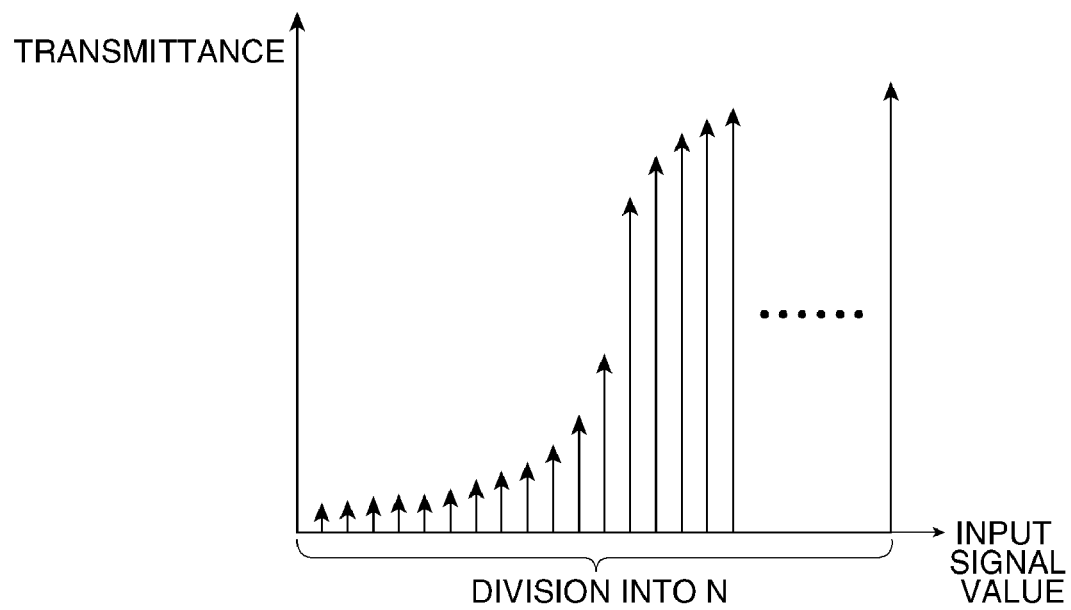
FIG. 5A and FIG. 5B are explanatory views showing characteristic information according to the first embodiment.
Figure 5B:
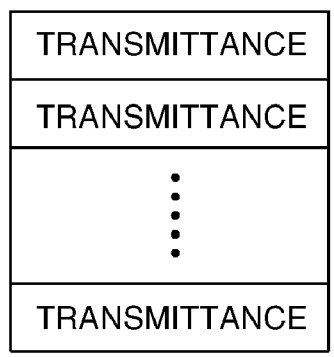

FIG. 5A and FIG. 5B are explanatory views showing characteristic information according to the first embodiment.

As shown in FIG. 5A, for example, the light modulation characteristic of the light modulation element provided in each projector shows how the transmittance (modulation rate) of the light modulation element changes in accordance with the input signal value prescribed by a video signal. In FIG. 5A, the horizontal axis represents input signal value, and the vertical axis represents transmittance. The transmittance on the vertical axis is a parameter equivalent to luminance of a projection image from a projector having the light modulation element.

The characteristic information in the first embodiment is a set of information that prescribes the light modulation characteristic shown in FIG. 5A. Since the range of signal value of the light modulation element control signal that controls the light modulation element (operating voltage range) is decided, the range of signal value is equally divided into N (where N is a natural number equal to or greater than 2), as shown in FIG. 5B, and an array of transmittance at each of (N+1) signal values can be used as a set of information representing characteristic information that prescribes the light modulation characteristic shown in FIG. 5A.

The characteristic information transmitting unit 52 shown in FIG. 4 transmits, for example, the characteristic information shown in FIG. 5B to each projector. Specifically, the characteristic information transmitting unit 52 transmits the characteristic information shown in FIG. 5B for each pixel of the projection image. More specifically, the characteristic information transmitting unit 52 transmits the characteristic information shown in FIG. 5B provided for each color component of R-component sub-pixels, G-component sub-pixels and B-component sub-pixels that constitute pixels of the projection image. Meanwhile, a sampling pixel may be defined in the projection image in advance, and the characteristic information transmitting unit 52 may interpolate the characteristic information of this sampling pixel by using a known interpolation technique, then calculate the characteristic information of each pixel in the image, and then transmit the characteristic information after the interpolation.

FIG. 6 is an explanatory view showing a conversion table stored in the conversion table storage unit 64 shown in FIG. 4.

In a conversion table stored in the conversion table storage unit 64, an output signal value to be outputted to the first projector PJ1 and an output signal value to be outputted to the second projector PJ2 are registered in association with an input signal value prescribed by an input video signal (video signal after analysis by the signal analyzing unit 58). When an input video signal is provided, the output signal values for the first and second projectors PJ1 and PJ2 stored in association with that input video signal are taken out. Then, the video signal corresponding to the output signal value for each projector is outputted to the video signal output unit 62 in the subsequent stage.

In FIG. 6, an input signal value includes 12 bits and an output signal value to each of the first and second projectors PJ1 and PJ2 includes 8 bits. That is, the number of gradation levels that can be expressed by an input video signal is greater than the number of gradation levels that can be expressed by a video signal supplied to each projector. By doing so, it becomes possible to use inexpensive projectors with a small number of gradation levels even in the case where an input content has a large number of gradation levels, and to accurately control a multi-gradation video at a low cost.

Next, effects of the video projection system 10 according to the first embodiment will be described.

Figure 7A:
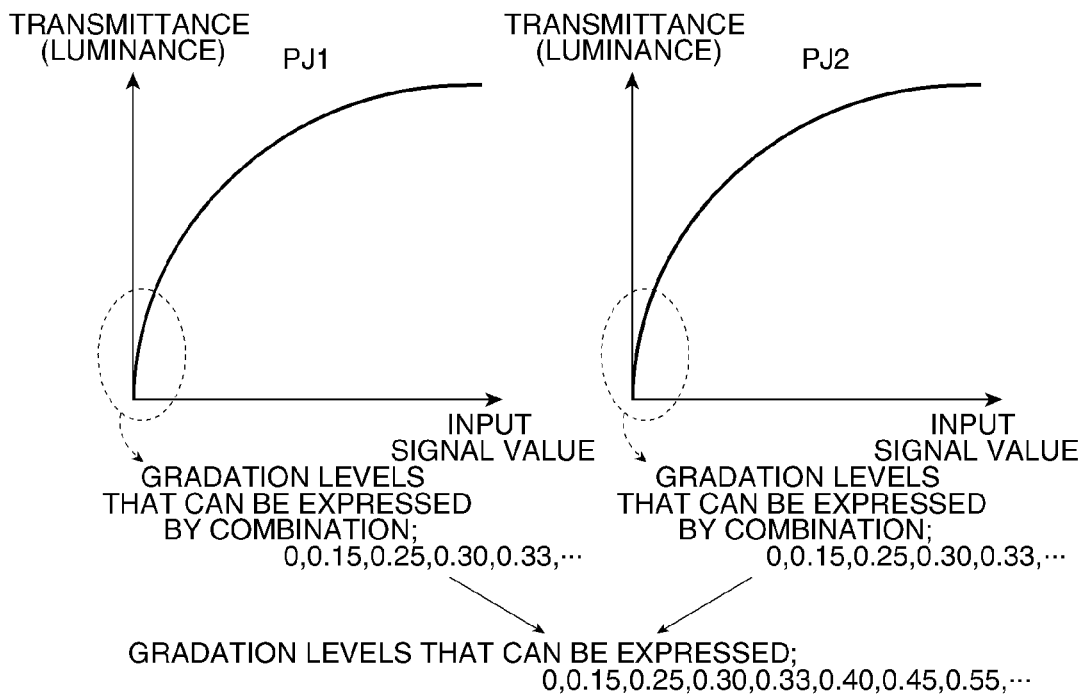
FIG. 7A and FIG. 7B are explanatory views showing effects of the video projection system according to the first embodiment.
Figure 7B:
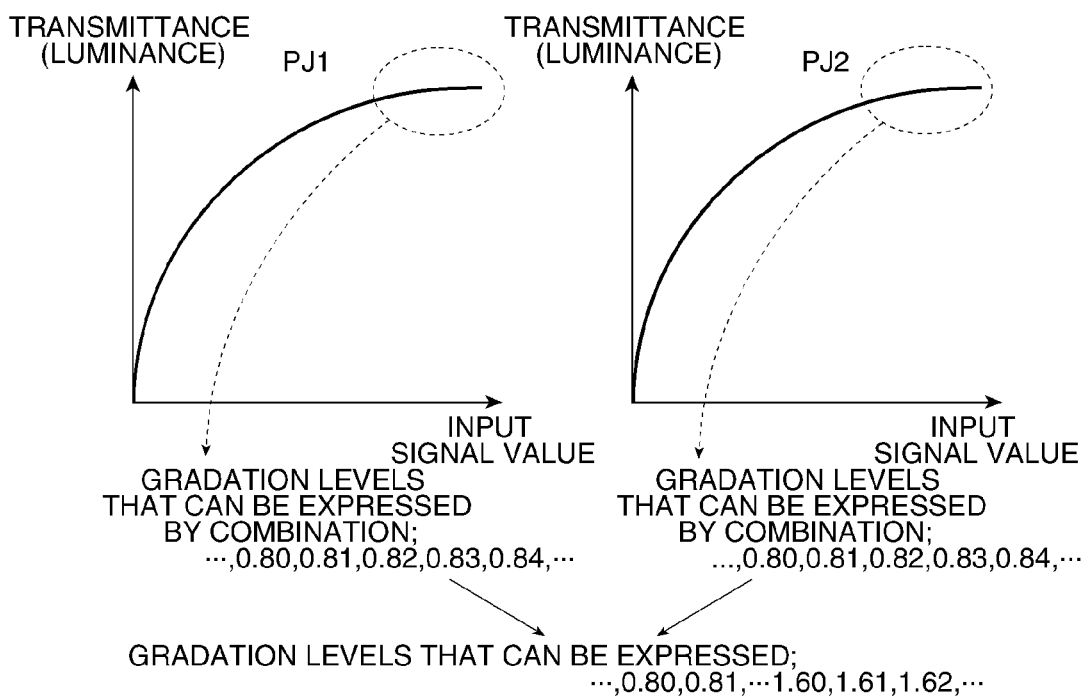

FIG. 7A and FIG. 7B are explanatory views showing effects of the video projection system 10 according to the first embodiment. FIG. 7A and FIG. 7B show exemplary effects in the case where the same light modulation characteristic is designated for the first and second projectors PJ1 and PJ2.

Figure 8:
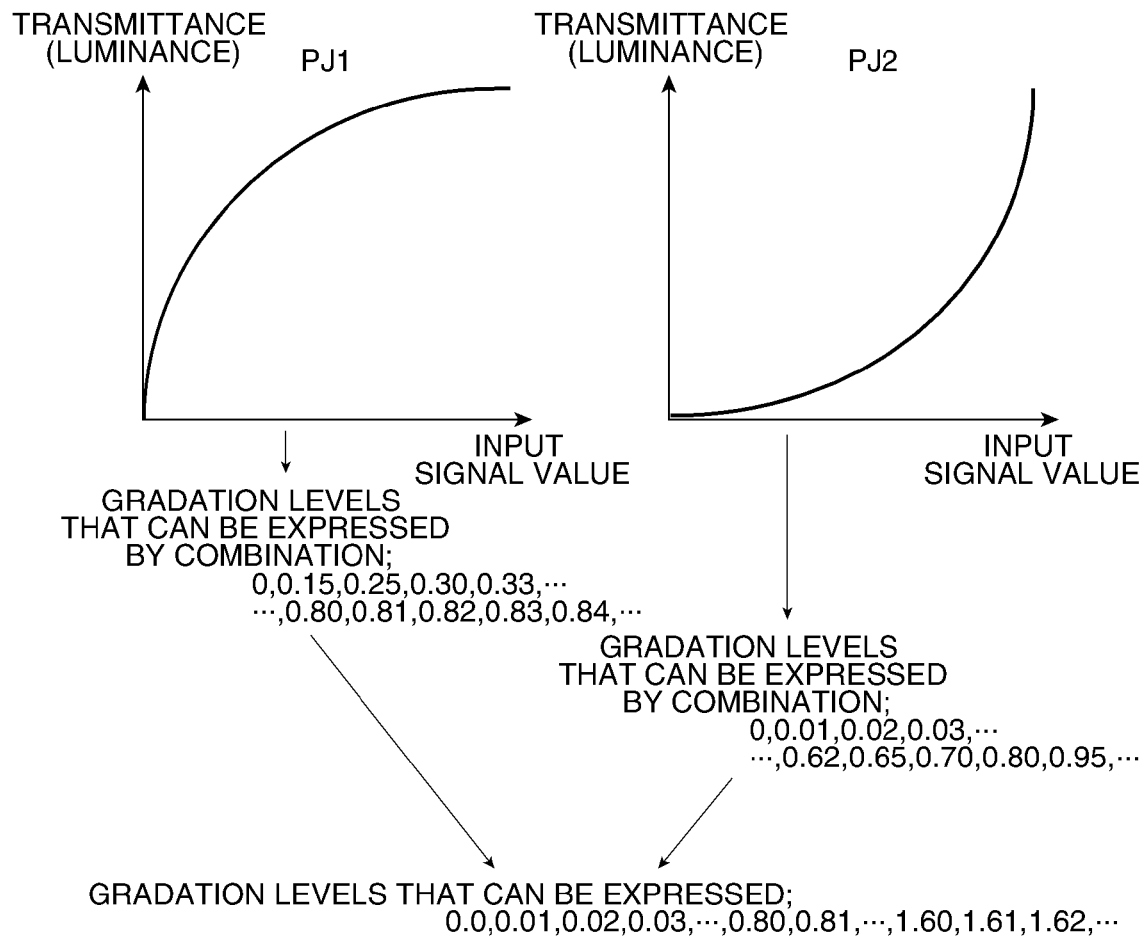
FIG. 8 is another explanatory view showing effects of the video projection system according to the first embodiment.

FIG. 8 is another explanatory view showing effects of the video projection system 10 according to the first embodiment. FIG. 8 shows exemplary effects in the case where different light modulation characteristics are designated for the first and second projectors PJ1 and PJ2.

As for the characteristics shown in FIG. 7A and FIG. 7B, it is assumed that the quantity of change in the input signal value is smaller for higher transmittance (that is, the quantity of change in the input signal value is greater for lower transmittance). However, the quantity of change in the input signal value may be smaller for lower transmittance (that is, the quantity of change in the input signal value may be greater for higher transmittance).

It is now assumed that gradation levels are expressed by numeric values normalized within the range of 0.0 to 1.0 (with 0.0 representing minimum luminance and 1.0 representing maximum luminance), and that gradation levels that can be expressed by each of the first and second projectors PJ1 and PJ2 are, for example, 0, 0.15, 0.25, 0.30, 0.33, and so on, as shown in FIG. 7A, on the low-luminance side (in FIG. 7A, the area where the gradation difference is large). In this case, gradation levels that can be expressed by the video projection system 10 according to the first embodiment are gradation levels that can be expressed by the combination of the two projectors. The gradation levels that can be expressed by the combination of the first and second projectors PJ1 and PJ2 include gradation levels that can be expressed by one projector and gradation levels that can be expressed by the two projectors, for example, 0, 0.15, 0.25, 0.30, 0.33, 0.40, 0.45, and so on. This enables a greater number of gradation levels to be expressed than the number of gradation levels that can be expressed by one projector.

Meanwhile, it is assumed that, as shown in FIG. 7B, on the high-luminance side (in FIG. 7B, the area where the gradation difference is small), gradation levels that can be expressed by each of the first and second projectors PJ1 and PJ2 are, for example, 0.80, 0.81, 0.82, 0.83, 0.84 and so on. In this case, gradation levels that can be expressed by the combination of the first and second projectors PJ1 and PJ2 include, for example, 0.80, 0.81, . . . , 1.60, 1.61, 1.62 and so on. Therefore, in the area where the gradation difference between the two projectors is small, the difference in gradation levels that can be expressed by the combination can be made much smaller than in the area where the gradation difference between the two projectors is large. This enables fine control of gradation expression.

As described above, even if the same light modulation characteristic is designated for the first and second projectors PJ1 and PJ2, the number of gradation levels can be increased by superimposing the two in display as in the first embodiment. Thus, gradation expression can be finely controlled.

On the other hand, it is now assumed that gradation levels that can be expressed by the first projector PJ1 include, for example, 0, 0.15, 0.25, 0.30, . . . , 0.80, 0.81, 0.82, 0.83, 0.84 and so on, whereas gradation levels that can be expressed by the second projector PJ2 include, for example, 0, 0.01, 0.02, 0.03, . . . , 0.62. 0.65, 0.70, 0.80, 0.95 and so on, and that different light modulation characteristics are designated for the two projectors, as shown in FIG. 8. In this case, gradation levels that can be expressed by the video projection system 10 according to the first embodiment are gradation levels that can be expressed by the combination of the two projectors. The gradation levels that can be expressed by the combination of the first and second projectors PJ1 and PJ2 include gradation levels that can be expressed by one projector and gradation levels that can be expressed by the two projectors, for example, 0.0, 0.01, 0.02, 0.03, . . . , 0.80, 0.81, . . . , 1.60, 1.61, 1.62 and so on. Thus, the gradation difference after the combination can be made small over the entire range irrespective of whether the gradation difference between the two projectors is large or small, and gradation expression can be finely controlled.

As described above, in the case where different light modulation characteristics are designated for the first and second projectors PJ1 and PJ2, superimposing the two in display as in the first embodiment enables the number of gradation levels to be increased securely. This enables fine control of gradation expression. Moreover, it is desirable that the signal conversion device 50 according to the first embodiment transmits different characteristic information to the first and second projectors PJ1 and PJ2 because it enables finer control of gradation than in the case shown in FIG. 7A or FIG. 7B.

In the first embodiment, the video projection system 10 includes two projectors as video projection devices. However, the video projection system 10 may include three or more video projection devices. In such cases, the signal conversion device supplies a video signal to the plural video projection devices that superimpose and display a projection image from each video projection device. The signal conversion device may include a characteristic information transmitting unit that transmits, to at least one of the plural video projection devices, characteristic information prescribing the light modulation rate of the light modulation element of that video projection device with respect to a video signal inputted to the video projection device, and a signal conversion processing unit that performs signal conversion processing corresponding to each video projection device to an input video signal in accordance with the characteristic information transmitted from the characteristic information transmitting unit and supplies the video signal after the signal conversion processing to each video projection device. It is desirable that the characteristic information transmitting unit transmits different characteristic information to first and second video projection devices of the plural video projection devices.

Second Embodiment

In the first embodiment, the output signal values for the first and second projectors are stored in advance in association with all the input signal values in the conversion table storage unit. However, the invention is not limited to this. In a second embodiment of the invention, stored information in the conversion table storage unit is reduced to realize further reduction in cost and to enable accurate control of multi-gradation videos.

The configurations of a video projection system and a projector as a video projection device according to the second embodiment are similar to those in the first embodiment and therefore will not be described further in detail. The configuration of a signal conversion device in the second embodiment is different from the configuration of the signal conversion device in the first embodiment.

Figures 9, 10:
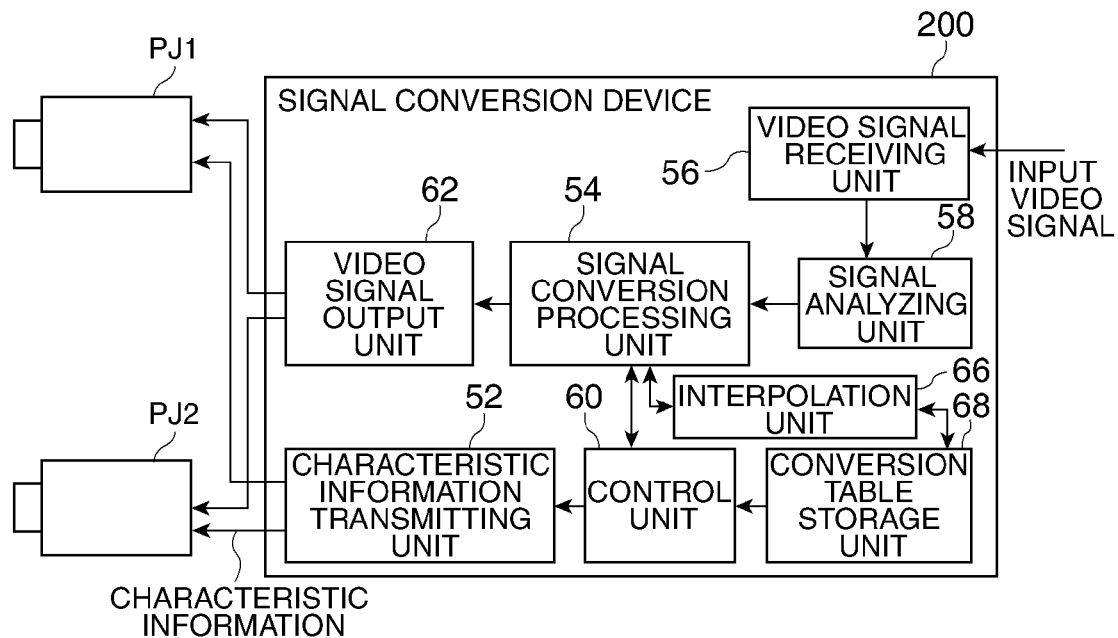
FIG. 9 is a block diagram showing an exemplary configuration of a signal processing device according to a second embodiment of the invention.
FIG. 10 is an explanatory view showing a conversion table storage unit shown in FIG. 9.

FIG. 9 is a block diagram showing an exemplary configuration of the signal conversion device according to the second embodiment of the invention. In FIG. 9, the same parts as in FIG. 4 are denoted by the same reference numerals and will not be described further in detail.

A signal conversion device 200 according to the second embodiment can be applied to the video projection system 10 according to the first embodiment, instead of the signal conversion device 50 of FIG. 1. The signal conversion device 200 according to the second embodiment can include an interpolation unit 66 in addition to the configuration of the signal conversion device 50 shown in FIG. 4 and can also include a conversion table storage unit 68 instead of the conversion table storage unit 64.

In the second embodiment, a video signal to be supplied to each projector included in plural projectors is registered in advance in association with an input video signal in the conversion table storage unit 68. The video signal corresponding to each projector associated with an input video signal from the signal analyzing unit 58 is acquired by searching the conversion table storage unit 68. The interpolation unit 66 interpolates the acquired video signal. The signal conversion processing unit 54 performs signal conversion processing, referring to the interpolated video signal.

FIG. 10 is an explanatory view showing the conversion table storage unit 68 shown in FIG. 9.

In the conversion table storage unit 68, storage information is stored that which stores an output signal value to be outputted to the first projector PJ1 and an output signal value to be outputted to the second projector PJ2 with respect to an input signal value prescribed by an input video signal. In this case, the input signal values are not all possible values but are discrete values. Meanwhile, a flag associated with an input signal value is stored in the conversion table storage unit 68. Which output signal value should be used for interpolation is designated in accordance with the flag information.

For example, if the flag stored in association with an input signal value 0x010 is 0, the interpolation unit 66 interpolates an input signal value of 0x010 to 0x018 by known interpolation processing (for example, the nearest neighbor method, bilinear method or the like) using 0x01 (the output signal value corresponding to the input signal value of 0x010) and 0x03 (the output signal value corresponding to the input signal value of 0x018) as the output signal value of the first projector PJ1. The interpolation unit 66 also outputs 0x00 (corresponding to the input signal value 0x010) as the output signal value of the second projector PJ2.

Meanwhile, for example, if the flag stored in association with an input signal value 0x020 is 1, the interpolation unit 66 interpolates an input signal value of 0x020 to 0x028 by known interpolation processing (for example, the nearest neighbor method, bilinear method or the like) using 0x01 (the output signal value corresponding to the input signal value of 0x020) and 0x05 (the output signal value corresponding to the input signal value of 0x028) as the output signal value of the second projector PJ2. The interpolation unit 66 also outputs 0x04 (corresponding to the input signal value 0x020) as the output signal value of the first projector PJ1.

The output signal values interpolated as described above are used for signal conversion processing by the signal conversion processing unit 54. Thus, when an input video signal is provided, the output signal values for the first and second projectors PJ1 and PJ2 stored in association with that input video signal are taken out. In this case, the flag is referred to when necessary. One of the output signal values is directly outputted and the output signal value acquired by interpolating the other is outputted. Then, the video signal corresponding to the output signal value for each projector is outputted to the video signal output unit 62 in the subsequent stage.

As described above, according to the second embodiment, since interpolation is carried out by the interpolation unit 66, the volume of stored information that should be stored in the conversion table storage unit 68 can be reduced.

Third Embodiment

In the signal conversion device according to the first embodiment or the second embodiment, signal conversion processing is performed to an input video signal by using the conversion table. However, the invention is not limited to this.

The configurations of a video projection system and a projector as a video projection device according to the third embodiment are similar to those in the first embodiment and therefore will not be described further in detail. The processing in the signal conversion device according to the third embodiment is different from the processing in the signal conversion device according to the first embodiment.

That is, in the signal conversion device according to the third embodiment, a first video signal having maximum luminance equal to or lower than an output target luminance, acquired by converting an input video signal, is supplied to one of the first and second projectors PJ1 and PJ2 (for example, the first projector PJ1). To the other projector (for example, the second projector PJ2), of the first and second projectors PJ1 and PJ2, an input video signal is converted to acquire a video signal so as to display an image having luminance equal to the difference between the output target luminance and the maximum luminance, and this video signal acquired by the conversion is supplied.

Therefore, the signal conversion processing unit of the signal conversion device according to the third embodiment has, for example, a central processing unit (CPU) and a memory. The CPU, reading a program stored in the memory, can execute the following processing.

Figure 11:
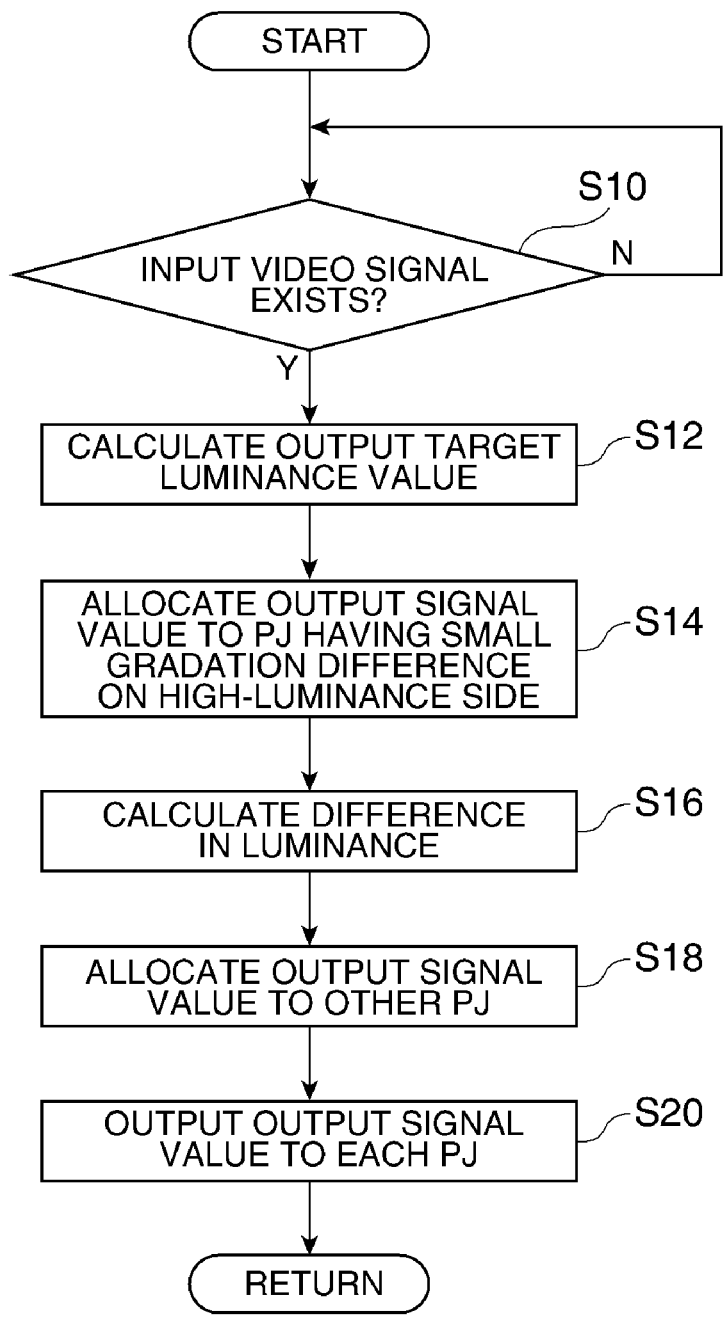
FIG. 11 is a flowchart showing exemplary processing by a signal conversion processing unit of a signal conversion device according to a third embodiment.

FIG. 11 is a flowchart showing exemplary processing by the signal conversion processing unit of the signal conversion device according to the third embodiment. That is, the memory provided in the signal conversion processing unit of the signal conversion device according to the third embodiment stores a program that realizes the processing shown in FIG. 11.

Figure 12:
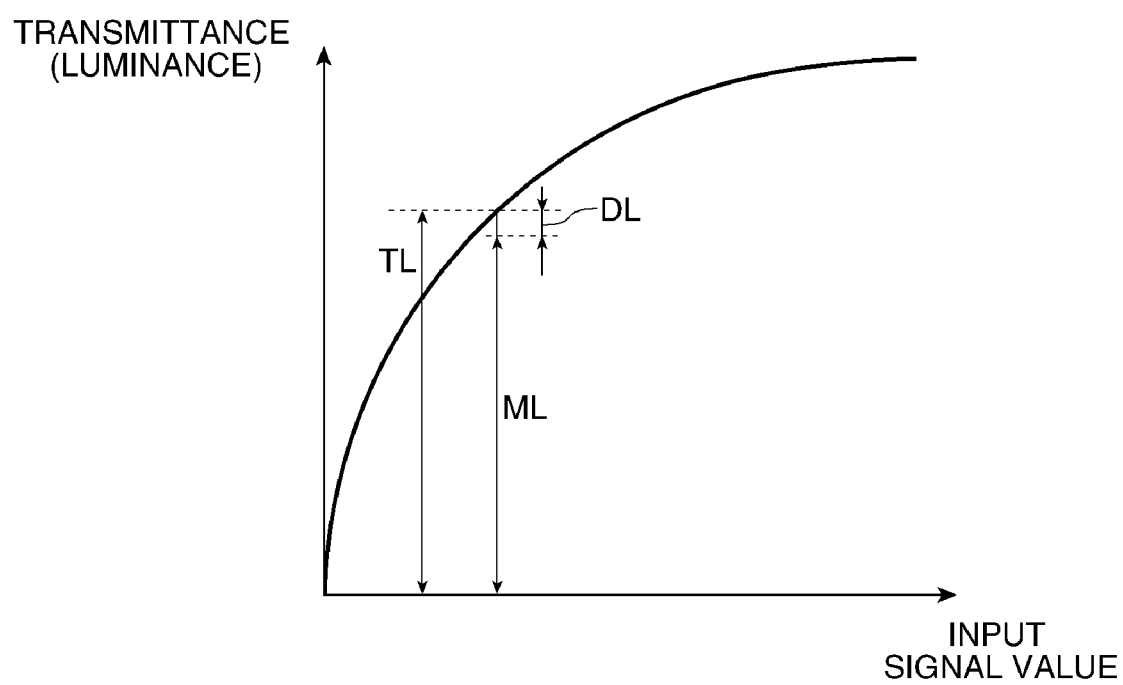
FIG. 12 is an explanatory view showing operation of the signal conversion processing unit of the signal conversion device according to the third embodiment.

FIG. 12 is an explanatory view showing operation of the signal conversion processing unit of the signal conversion device according to the third embodiment. FIG. 12 shows an exemplary light modulation characteristic of the video projection system according to the third embodiment.

First, the signal conversion processing unit waits for an input video signal from the signal analyzing unit 58 (N in step S10). When an input video signal is inputted from the signal analyzing unit 58 (Y in step S10), the signal conversion processing unit calculates output target luminance (TL in FIG. 12) defined by the light modulation characteristic of the video projection system according to the third embodiment (step S12).

Then, the signal conversion processing unit allocates, to a projector having a small gradation difference on the high-luminance side, an output signal value corresponding to the input signal value in accordance with the light modulation characteristic of the light modulation element of that projector (step S14). At this time, the signal conversion processing unit allocates an output signal value having maximum luminance (ML in FIG. 12) equal to or lower than the output target luminance, and outputs a video signal corresponding to this output signal value to the projector.

Next, the signal conversion processing unit calculates the differential luminance (DL in FIG. 12) between the output target luminance (TL in FIG. 12) and the maximum luminance (ML in FIG. 12) (step S16). Then, the signal conversion processing unit allocates, to another projector that is different from the projector allocated in step S14, an output signal value that provides the luminance DL in accordance with the light modulation characteristic of the light modulation element of the projector (step S18).

Thus, the signal conversion processing unit performs processing to output video signals corresponding to the output signal values found in step S14 and step S18 to their respective projectors (step S20) and then goes back to step S10 (return).

According to the above third embodiment, the conversion table as in the first embodiment or the second embodiment need not be prepared. Moreover, according to the third embodiment, it is not necessary to search the conversion table that becomes more complicated by increase in the number of projectors constituting the video projection system. Therefore, allocation of a signal to each projector can be simplified and multi-gradation videos can be accurately controlled.

In the third embodiment, the video projection system includes the first and second projectors. However, similar operations apply to the case where the video projection system includes three or more projectors. That is, when displaying an image having output target luminance corresponding to an input video signal by using plural video projection devices, the signal conversion processing unit supplies a first video signal having maximum luminance equal to or lower than the output target luminance to a first video projection device, which is one of the plural video projection devices. The signal conversion processing unit supplies, to each of the remaining video projection devices except the first video projection device of the plural video projection devices, a video signal to display an image having differential luminance between the output target luminance and the maximum luminance by using each of the remaining video projection devices.

In this case, the signal conversion processing unit converts the input video signal to the first video signal in accordance with the characteristic of the light modulation element of the first video projection device, and converts the input video signal to the video signal corresponding to each of the remaining video projection devices in accordance with characteristic of the light modulation element of each of the remaining video projection devices.

Fourth Embodiment

In the first, second and third embodiments, the signal conversion device transmits characteristic information prescribing the light modulation characteristic to the projectors, irrespective of the light modulation characteristics of the light modulation elements of the projectors. However, the invention is not limited to this. In a fourth embodiment of the invention, a projector transmits characteristic information that prescribes the light modulation characteristic of its light modulation element to the signal conversion device, and in accordance with the received characteristic information, the signal conversion device transmits characteristic information again to at least one of plural projectors constituting the video projection system.

Thus, in the video projection system including a projector having characteristic information that is not rewritable, the light modulation characteristics of the other projectors are controlled in accordance with the characteristic of the projector having the characteristic information that is not rewritable, thereby enabling control of the light modulation characteristics of the system as a whole. Consequently, a video projection system can be provided that realizes an image display with a high pixel density by a simple configuration even if the system includes a projector having characteristic information that is not rewritable.

The video projection system according to the fourth embodiment of the invention has substantially the same configuration as the first embodiment and therefore its configuration will not be described further in detail.

Figure 13:
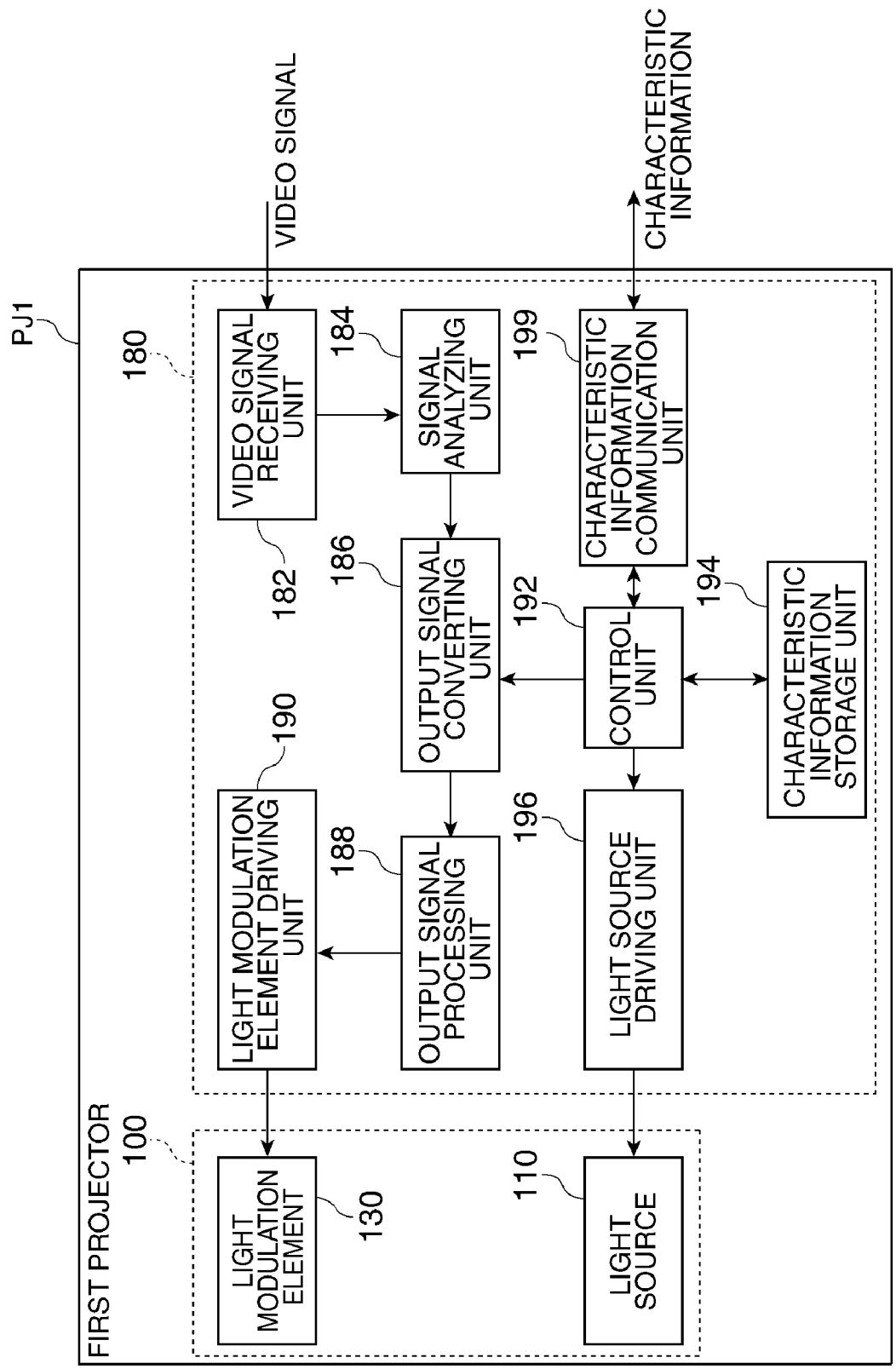
FIG. 13 is a block diagram showing an exemplary configuration of a first projector according to a fourth embodiment.

FIG. 13 is a block diagram showing an exemplary configuration of a first projector according to the fourth embodiment. In FIG. 13, the same parts as in FIG. 2 are denoted by the same reference numerals and will not be described further in detail. Like FIG. 2, FIG. 13 shows an exemplary configuration of the first projector. However, other projectors constituting the video projection system according to the fourth embodiment (for example, the second projector if the video projection system includes first and second projectors) may have a similar configuration.

The configuration of the first projector PJ1 shown in FIG. 13 is different from the configuration of the first projector PJ1 shown in FIG. 2 in that a characteristic information communication unit (characteristic information transmitting and receiving unit) 199 is provided instead of the characteristic information receiving unit 198. The characteristic information communication unit 199 has the function of a characteristic information transmitting unit that functions to transmit characteristic information prescribing the light modulation characteristic of the first projector PJ1 to the signal conversion device, as well as the function of the characteristic information receiving unit 198 of FIG. 2. Therefore, the first projector PJ1 in the fourth embodiment can transmit the characteristic information of the first projector PJ1 in response to a characteristic information transmission request from the signal conversion device according to the fourth embodiment.

Figure 14:
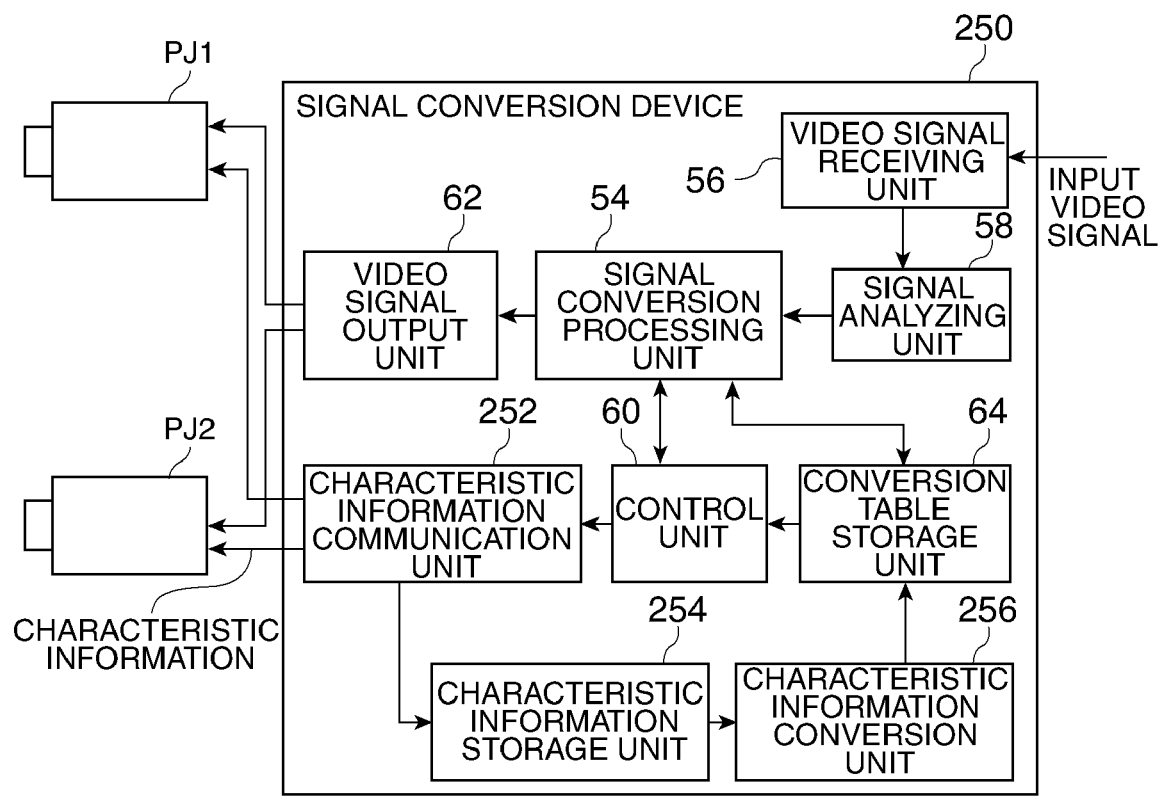
FIG. 14 is a block diagram showing an exemplary configuration of a signal conversion device according to the fourth embodiment.

FIG. 14 is a block diagram showing an exemplary configuration of the signal conversion device according to the fourth embodiment. In FIG. 14, the same parts as in FIG. 4 are denoted by the same reference numerals and will not be described further in detail. In FIG. 14, the interpolation unit 66 described with reference to FIG. 9 may be provided.

The configuration of a signal conversion device 250 according to the fourth embodiment shown in FIG. 14 is different from the configuration of the signal conversion device 50 shown in FIG. 4 in that a characteristic information communication unit (characteristic information transmitting and receiving unit) 252 is provided instead of the characteristic information transmitting unit 52, and that a characteristic information storage unit 254 is additionally provided. The characteristic information communication unit 252 has the function of a characteristic information receiving unit that functions to receive characteristic information prescribing the light modulation characteristic of each projector from each projector constituting the video projection system, as well as the function of the information characteristic transmitting unit 52 of FIG. 4. Thus, the signal conversion device 250 according to the fourth embodiment saves the characteristic information from each projector received by the characteristic information communication unit 252, into the characteristic information storage unit 254. The signal conversion device 250 changes the conversion table stored in the conversion table storage unit 64 in accordance with the characteristic information of each projector stored in the characteristic information storage unit 254, and thus can transmit the characteristic information again in order to prescribe the light modulation characteristic of each projector.

For example, if the combination of light modulation characteristics of projectors constituting the video projection system is known, as in the first embodiment, the characteristic information may be transmits from the signal conversion device irrespective of the light modulation characteristic of each projector in order to cause each projector to realize a desired light modulation characteristic. Meanwhile, in the case of attempting to realize an optimum gradation expression in accordance with the light modulation characteristic of at least one of the plural projectors constituting the video projection system, or in the case where the system includes a projector having characteristic information that is not rewritable, it is desirable that the light modulation characteristics of the other projectors are changed in accordance with the light modulation characteristic of the one projector. In such cases, characteristic information is gathered and then analyzed, and the light modulation characteristic of each projector may be adjusted again.

Thus, the signal conversion device 250 according to the fourth embodiment further includes a characteristic information conversion unit 256. The characteristic information conversion unit 256 changes the characteristic information saved in the characteristic information storage unit 254. The signal conversion processing unit 54 can perform signal conversion processing by using the conversion table corresponding to the changed characteristic information. More specifically, the characteristic information conversion unit 256 performs conversion so that the characteristic information of the first projector PJ1 (first video projection device) constituting the video projection system is information acquired from the inverse function of a function calculated from the characteristic information of the second projector PJ2 (second video projection device).

Figure 15A:
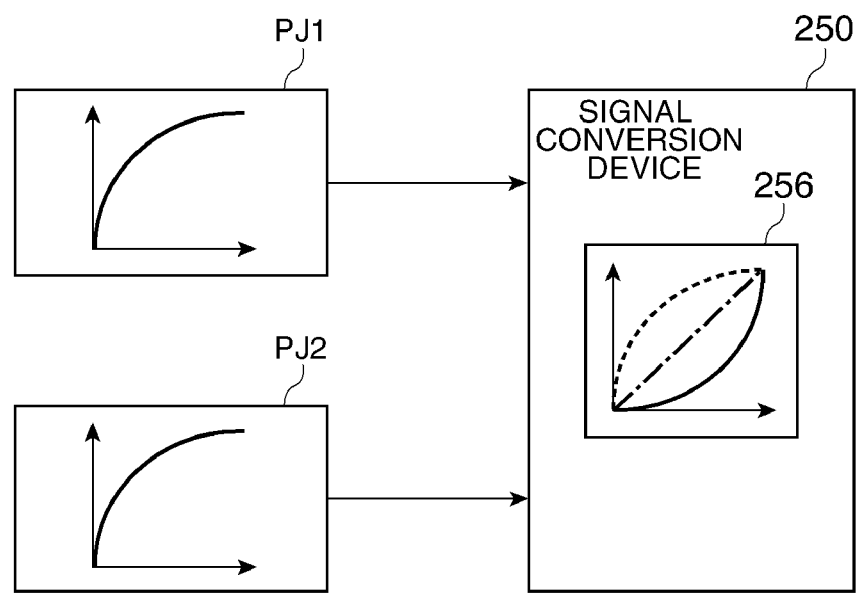
FIG. 15A and FIG. 15B are explanatory views showing exemplary operation of a video projection system according to the fourth embodiment.
Figure 15B:
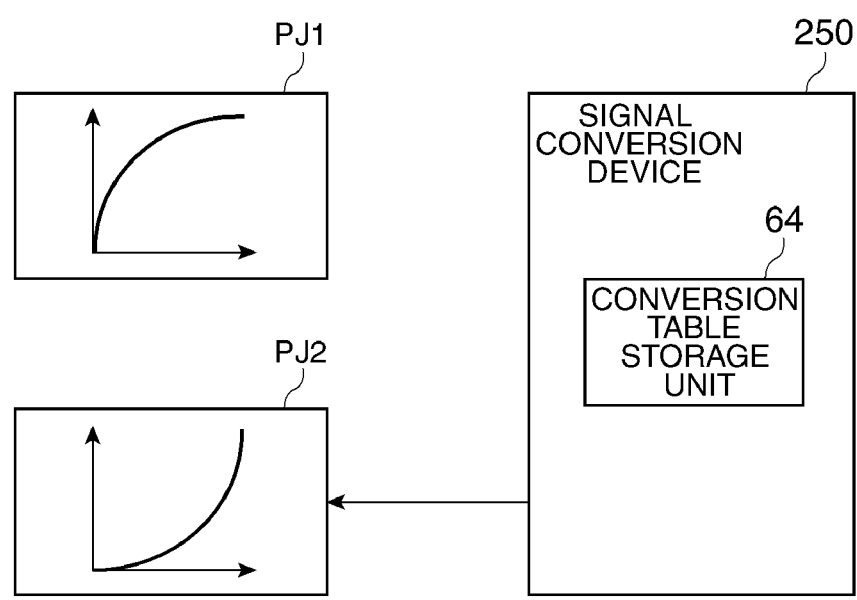

FIG. 15A and FIG. 15B are explanatory views showing exemplary operation of the video projection system according to the fourth embodiment.

For example, as shown in FIG. 15A, the signal conversion device 250 acquires the characteristic information of the first and second projectors PJ1 and PJ2 constituting the video projection system. Then, the characteristic information conversion unit 256 selects, for example, one of the two projectors, and calculates the characteristic information of the other projector by using the inverse function of the function calculated from the characteristic information of the selected projector. After that, as shown in FIG. 15B, the characteristic information communication unit 252 transmits the converted characteristic information to the other projector.

A projector as a characteristic information conversion target may be defined in advance and characteristic information may be gathered from all the other projectors except the conversion target projector. Moreover, in the fourth embodiment, the plural projectors constituting the video projection system may include the projectors according to the first embodiment and the projectors according to the fourth embodiment.

As described above, in the fourth embodiment, the first video projection device of the plural video projection devices constituting the video projection system transmits, to the signal conversion device, characteristic information prescribing the light modulation rate of the light modulation element of the first video projection device with respect to a video signal inputted to the first video projection device. The signal conversion device transmits, to the second video projection device of the plural video projection devices, characteristic information corresponding to the characteristic information of the light modulation element of the first video projection device. Thus, according to the fourth embodiment, gradation can be finely controlled over the entire range including the high-luminance range and the low-luminance range, as described with reference to FIG. 8.

Fifth Embodiment

In the first, second, third and fourth embodiments, the projectors and the signal conversion device are separately provided. However, the invention is not limited to this. In a fifth embodiment of the invention, the signal conversion device according to the first, second, third or fourth embodiment is provided in one of plural projectors that constitute a video projection system. Hereinafter, it is assumed that, in a video projection system including first and second projectors PJ1 and pJ2, the signal conversion device according to one of the above embodiments is provided in the first projector PJ1.

Figure 16:
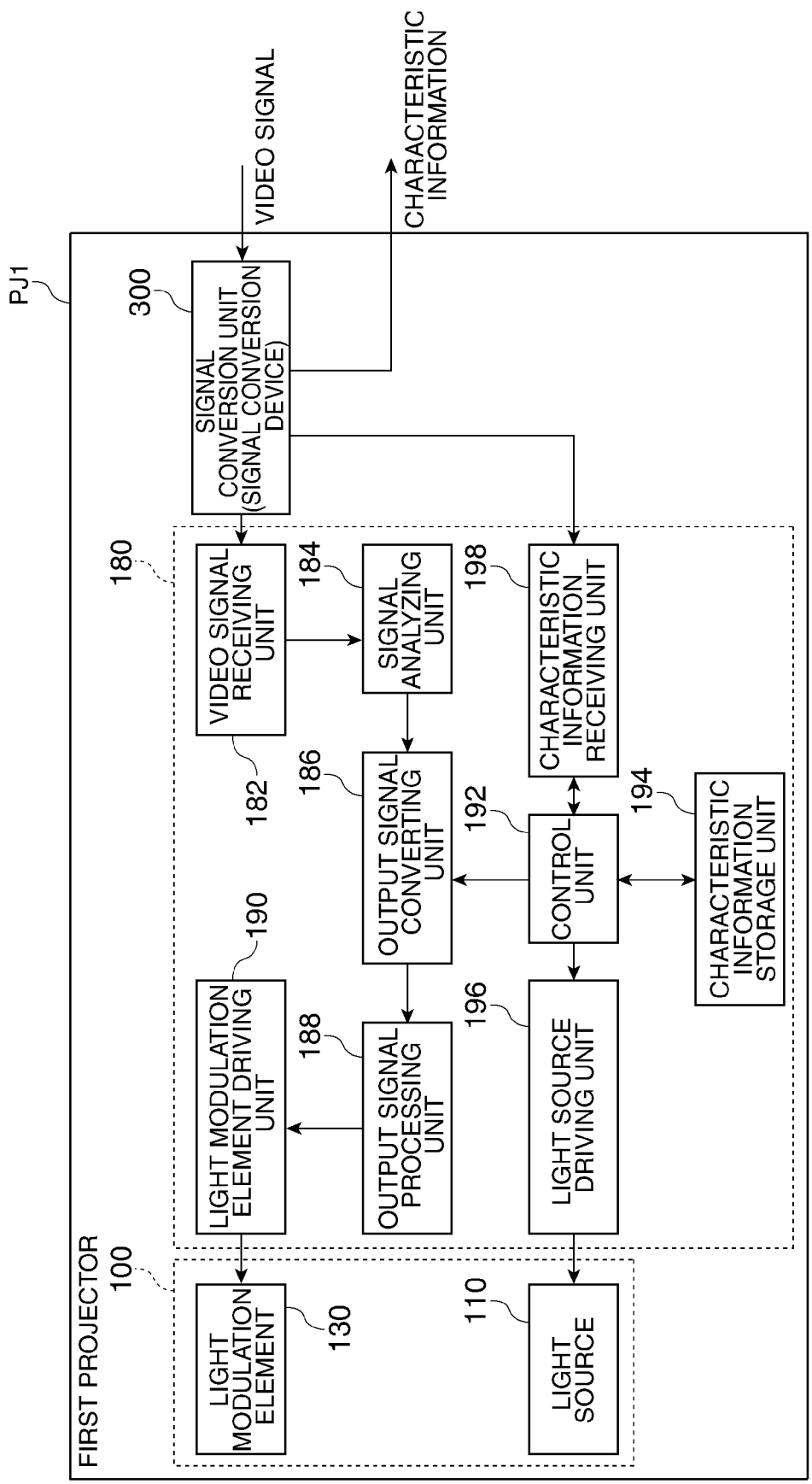
FIG. 16 is a block diagram showing an exemplary configuration of a first projector according to a fifth embodiment.

FIG. 16 is a block diagram showing an exemplary configuration of the first projector PJ1 according to the fifth embodiment. In FIG. 16, the same parts as in FIG. 2 are denoted by the same reference numerals and will not be described further in detail.

As shown in FIG. 16, the first projector PJ1 according to the fifth embodiment includes a signal conversion unit (signal conversion device) 300 in addition to the configuration shown in FIG. 2. The signal conversion unit 300 has the same functions as the signal conversion device according to the first, second or third embodiment. Therefore, the video signal receiving unit 182 receives a video signal from the signal conversion unit 300. The characteristic information receiving unit 198 receives characteristic information from the signal conversion unit 300. Meanwhile, the signal conversion unit 300 outputs, to the other projectors than the first projector PJ1 of the plural projectors constituting the video projection system, a video signal corresponding to each of the other projectors.

The signal conversion unit 300 may have the same configuration as the signal conversion device according to the fourth embodiment, and the first projector PJ1 shown in FIG. 16 may have the characteristic information communication unit 199 instead of the characteristic information receiving unit 198.

Figure 17:
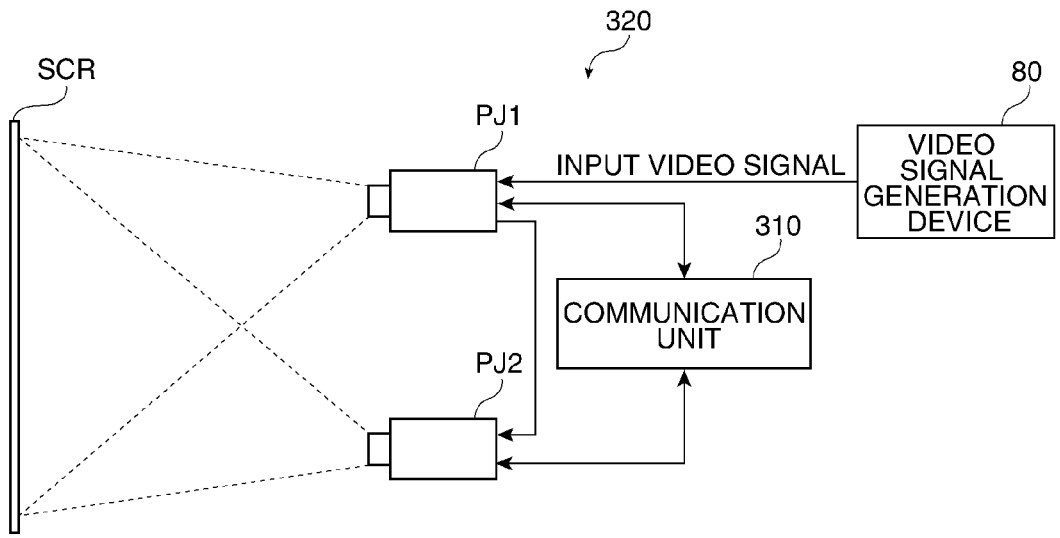
FIG. 17 is a block diagram showing an exemplary configuration of a video projection system according to the fifth embodiment of the invention.

FIG. 17 shows an exemplary configuration of a video projection system 320 according to the fifth embodiment. In FIG. 17, the same parts as in FIG. 1 are denoted by the same reference numerals and will not be described further in detail.

In FIG. 17, the first projector PJ1 is the projector shown in FIG. 16 and includes the signal conversion device according to one of the above embodiments. The video projection system 320 according to the fifth embodiment further includes a communication unit 310, which enables transmission of characteristic information from the first projector PJ1 to the second projector PJ2.

In this video projection system 320, an input video signal from the video signal generation device 80 is directly inputted to the signal conversion unit 300 of the first projector PJ1. The signal conversion unit 300 can also transmit characteristic information to the second projector PJ2 by using the communication unit 310. The signal conversion unit 300 of the first projector PJ1 performs the above signal conversion processing and projects an image on the screen SCR based on the video signal after signal conversion processing for the first projector PJ1. The signal conversion unit 300 also outputs the video signal after signal conversion processing for the second projector PJ2 to the second projector PJ2 and causes the second projector PJ2 to project an image on the screen SCR based on this video signal.

Sixth Embodiment

In the above embodiments, the characteristic information of all the projectors that constitute the video projection system is configured to be rewritable. However, the invention is not limited to this.

Figure 18:
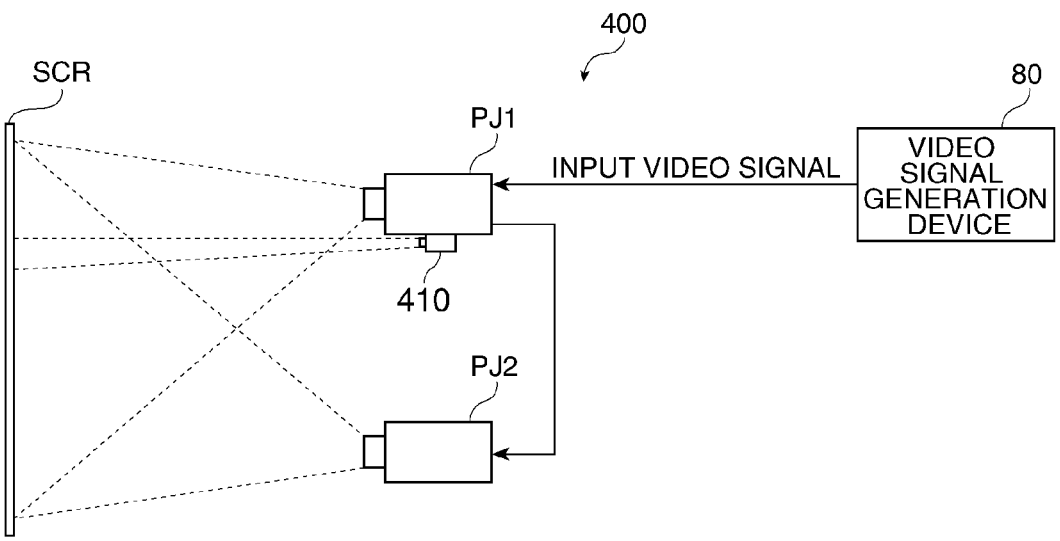
FIG. 18 is a block diagram showing an exemplary configuration of a video projection system according to a sixth embodiment of the invention.

FIG. 18 shows an exemplary configuration of a video projection system according to a sixth embodiment of the invention. In FIG. 18, the same parts as in FIG. 1 are denoted by the same reference numerals and will not be described further in detail.

In FIG. 18, the first projector PJ1 is the projector shown in FIG. 16 and includes the signal conversion device according to one of the above embodiments. In a video projection system 400 according to the sixth embodiment, the first projector PJ1 further includes a camera 410 as a luminance detecting unit, which can detect luminance of projection images of the other projectors than the first projector PJ1 of the plural projectors constituting the video projection system 400.

That is, the second projector PJ2 is caused to project a predetermined video pattern on the screen SCR. Then, the camera 410 of the first projector PJ1 detects luminance of the video of the second projector PJ2 projected on the screen SCR and characteristic information that prescribes the light modulation characteristic of the second projector PJ2 is gathered. Then, the signal conversion device provided in the first projector PJ1 converts the light modulation characteristic of the first projector PJ1 in accordance with the gathered characteristic information and rewrites the characteristic information of the first projector PJ1. In this case, for example, the characteristic information of the first projector PJ1 (first video projection device) is converted to be the information obtained from the inverse function of a function found from the characteristic information of the second projector PJ2 (second video projection device).

Subsequently, an input video signal from the video signal generation device 80 is converted to video signals for the first and second projectors PJ1 and PJ2. The first projector PJ1 displays an image based on the rewritten characteristic information. On the other hand, the second projector PJ2 receives the video signal from the first projector PJ1 and displays an image.

In this manner, the luminance detecting unit is provided that detects luminance of a projection image of the other video projection device projected on the screen, and a video signal converted from an input video signal on the basis of the luminance detected by the luminance detecting unit is supplied to the other video projection device. Thus, even if this other video projection device does not have the function of changing its characteristic information, a video projection system can be provided that accurately realizes a high pixel density and multiple gradation levels in accordance with the characteristics of the plural video projection devices. Moreover, the characteristic information that prescribes the light modulation rate of the light modulation element of the first video projection device with respect to a video signal inputted to the first video projection device of the plural video projection devices constituting the video projection system can be the information obtained from the inverse function of a function found from the characteristic information that prescribes the light modulation rate of the light modulation element of the second video projection device with respect to a video signal inputted to the second video projection device. Thus, multiple gradation levels can be accurately realized.

In the sixth embodiment, the signal conversion device is provided within the first projector PJ1. However, the signal conversion device may be provided outside the first projector PJ1 as shown in FIG. 1, and the first projector PJ1 of FIG. 1 may include the camera 410 of the sixth embodiment.

The embodiments of the signal conversion device, the video projection device and the video projection system according to the invention are described above. However, the invention is not limited to the above embodiments and can be carried out various other embodiments without departing from the scope of the invention. For example, the following modifications can be made.

In the above embodiments, in the video projection system, projection images of two projectors are superimposed and displayed. However, the invention is not limited to this. A similar effect to the above embodiments or a higher effect can be achieved by superimposing projection images of three or more projectors.

In the above embodiments, a light valve is used as the light modulation unit. However, the invention is not limited to this. For example, a DLP (Digital Light Processing) (trademark registered), LCOS (Liquid Crystal On Silicon) or the like may also be employed as the light modulation unit.

In the above embodiments, a light valve using a transmitting-type liquid crystal panel of the so-called three-plate system is employed as the light modulating unit. However, a light valve using a transmitting-type liquid crystal panel having four or more plates may also be employed.

In the above embodiments, the video projection system includes plural projectors, each of which has a projection unit and a light modulation element. However, the invention is not limited to this. The video projection system according to the invention may include at least one projector that has one projection unit and plural light modulation elements equivalent to the plural projectors in the above embodiments.

In the above embodiments, the invention is described as a signal conversion device, a video projection device and a video projection system. However, the invention is not limited to these. For example, a program in which processing procedures of a signal conversion device, video projection device or video projection system to realize the invention are described, or a recording medium in which the program is recorded may also be employed.

The entire disclosure of Japanese Patent Application No. 2007-319281, filed Dec. 11, 2007 is expressly incorporated by reference herein.

What is claimed is:

1. A signal conversion device that supplies a video signal to each video projection device of plural video projection devices that display a video image by superimposing the projection image, the device comprising:
   a characteristic information transmitting unit that transmits, to at least one video projection device of the plural video projection devices, characteristic information representing a light modulation characteristic of a light modulation element provided in the at least one video projection device; and
   a signal conversion processing unit that performs signal conversion processing corresponding to each of the video projection devices to an input video signal in accordance with the characteristic information transmitted from the characteristic information transmitting unit, and supplies the video signal after the signal conversion processing to each of the video projection devices, wherein the signal conversion processing unit transmits the video signal independently from the characteristic information transmitting unit transmitting the characteristic information, and
   wherein the characteristic information is transmitted to the first and second video projection devices prior to the video signal.

2. The signal conversion device according to claim 1, wherein the characteristic information transmitting unit transmits different characteristic information to first and second video projection devices of the plural video projection devices.

3. The signal conversion device according to claim 2, wherein characteristic information representing a light modulation characteristic of a light modulation element provided in the first video projection device is obtained from an inverse function of a function calculated from characteristic information representing a light modulation characteristic of a light modulation element provided in the second video projection device.

4. The signal conversion device according to claim 1, wherein the number of gradation levels that can be expressed by the input video signal is greater than the number of gradation levels that can be expressed by a video signal supplied to each of the video projection devices.

5. A video projection device comprising:
   the signal conversion device according to claim 1; and
   a projection unit that projects a video in accordance with a video signal from the signal conversion device.

6. The video projection device according to claim 5, further comprising a luminance detecting unit that detects luminance of a projection image from another video projection device projected on a screen,
   wherein the input video signal is supplied to the video projection device and a video signal converted from the input video signal in accordance with the luminance detected by the luminance detecting unit is to project a video.

7. A video projection system comprising:
   the signal conversion device according to claim 1; and
   plural video projection devices that project an image in accordance with a video signal from the signal conversion device;

wherein a projection image from each video projection device of the plural video projection devices is superimposed and displayed.

8. The video projection system according to claim 7, wherein a first video projection device of the plural video projection devices transmits characteristic information representing a light modulation characteristic of a light modulation element of the first video projection device to the signal conversion device, and the signal conversion device transmits characteristic information corresponding to the characteristic information of the light modulation element of the first video projection device to a second video projection device of the plural video projection devices.

9. A signal conversion device that supplies a video signal to each video projection device of plural video projection devices that display a video image by superimposing the projection image, the device comprising:

a characteristic information transmitting unit that transmits, to at least one video projection device of the plural video projection devices, characteristic information representing a light modulation characteristic of a light modulation element provided in the at least one video projection device;

a signal conversion processing unit that performs signal conversion processing corresponding to each of the video projection devices to an input video signal in accordance with the characteristic information transmitted from the characteristic information transmitting unit, and supplies the video signal after the signal conversion processing to each of the video projection devices, wherein the signal conversion processing unit transmits the video signal independently from the characteristic information transmitting unit transmitting the characteristic information; and a characteristic information storage unit which stores characteristic information representing a light modulation characteristic of a light modulation element provided in the first video projection device in advance of the video signal being sent to the first and second video projection device, the characteristic information being obtained from an inverse function of a function calculated from characteristic information representing a light modulation characteristic of a light modulation element provided in the second video projection device.

* * * * *